No. 787,874. PATENTED APR. 18, 1905.
A. BULLING.
ATOMIZING INHALER.
APPLICATION FILED MAR. 2, 1904.

No. 787,874.

Patented April 18, 1905.

UNITED STATES PATENT OFFICE.

ANTON BULLING, OF MUNICH, GERMANY, ASSIGNOR TO CARL RITTER VON WESSELY, OF VIENNA, AUSTRIA-HUNGARY.

ATOMIZING-INHALER.

SPECIFICATION forming part of Letters Patent No. 787,874, dated April 18, 1905.

Application filed March 2, 1904. Serial No. 196,219.

*To all whom it may concern:*

Be it known that I, ANTON BULLING, a citizen of the Empire of Germany, residing at Munich, Germany, have invented certain new and useful Improvements in Atomizing-Inhalers; and I do hereby declare the following to be a full, clear, and exact description of the invention, such as will enable others skilled in the art to which it appertains to make and use the same.

My invention relates to atomizers, and has for its object the provision of efficient means for intimately mixing oily and other medicaments with a suitable liquid vehicle, such as water, preparatory to atomizing the same.

In the accompanying drawings I have shown a form of apparatus embodying my invention in a preferred form, in which—

Figure 1:
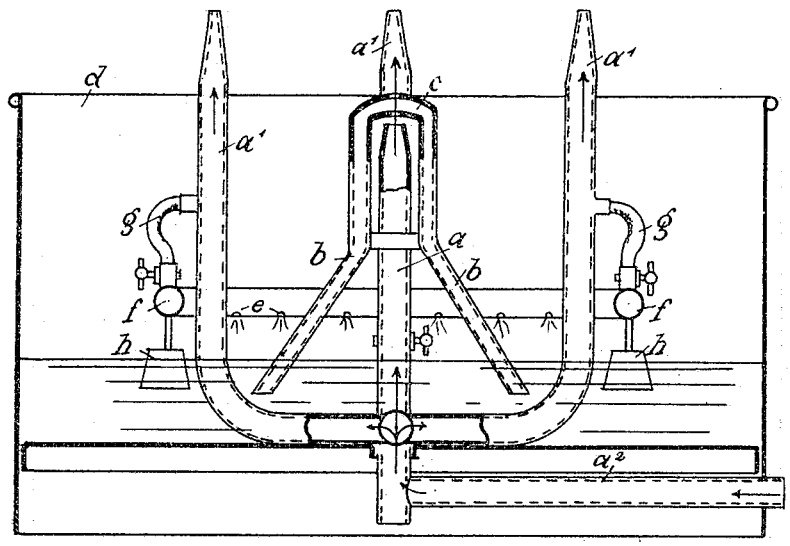
Figure 2:
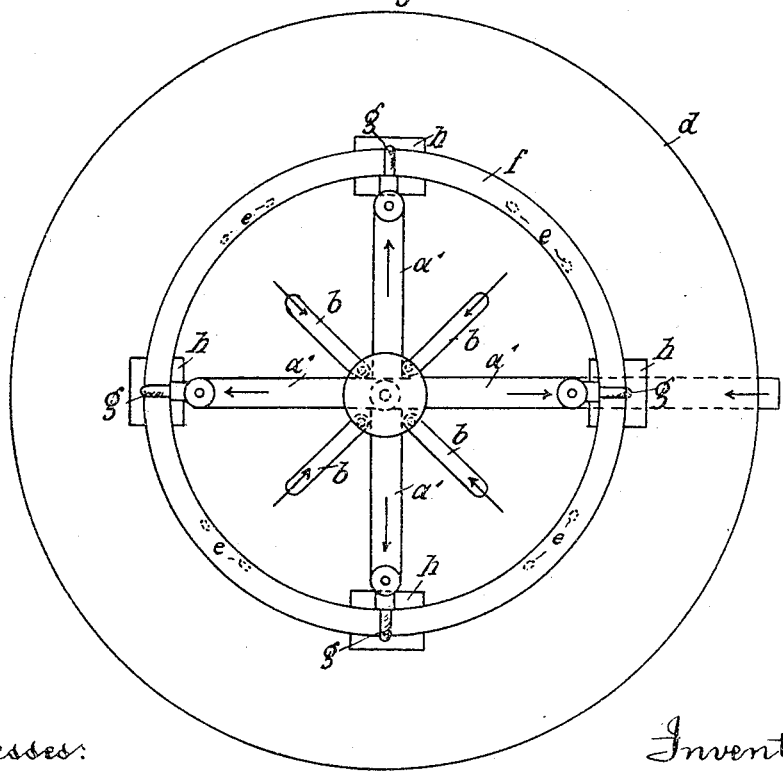

Figure 1 is a central section, and Fig. 2 is a top plan view.

Referring to the drawings more in detail, the central air-tube $a$ and the concentrically-arranged air-tubes $a'$ are connected, by means of the pipe $a^2$, with a suitable source of compressed air. The tubes $b$ merging into the cap $c$ form the channels for the supply of the medicament and the liquid vehicle, and the tube $a$, discharging through the cap $c$, produces an efficient atomizing effect, as will be readily understood.

The apparatus so far as described is disposed within a vessel $d$, containing the liquid and the medicaments, which latter in the case of oily medicaments will float upon the surface of the liquid, usually water.

It is the object of my invention to effect a mixture of the substances prior to their entry into the tubes $b$, and to this end I discharge upon the surface of the same streams of air under pressure through the holes $e$ in the lower side of the circular tube $f$, which communicates with the tubes $a'$ by means of the valved pipes $g$ and is maintained at a uniform distance above the surface of the water by means of the supporting-floats $h$.

It will be seen that the force of the air-currents striking directly downward upon the surface of the oily matter floating upon the water will drive the same beneath the surface and cause the diffusion thereof in minute particles throughout the upper portion of the water, whence the mixture will be sucked by the tubes $b$ and led to the atomizing-chamber $c$, the concentrically-arranged tubes $a'$ serving to increase the atomizing effect and maintain its uniformity.

Having thus fully set out my invention and the manner of its operation, what I claim, and desire to secure by Letters Patent, is—

1. In an atomizer, the combination with a vessel for containing medicaments and a liquid vehicle, an atomizing-chamber, and a passage for conducting the medicaments thereto, of a float sustained by the liquid vehicle and means carried by the float and arranged to direct a current of air under pressure upon the surface of the medicaments and thereby diffusing the medicaments in the liquid vehicle.

2. In an atomizer, the combination with a vessel for containing oily medicaments and a liquid vehicle, an atomizing-chamber and passages leading from below the surface of the vehicle to the atomizing-chamber, of a pipe supported above the surface of the liquid and having perforations on its under side, and means for forcing air under pressure through said perforations downward upon the surface of the oily medicaments adjacent to the inlets of the passages.

3. In an atomizer, the combination with a vessel for containing oily medicaments and a liquid vehicle, of a passage leading from a convenient source of compressed air and terminating in a central discharge tube and nozzle, a cap surrounding the nozzle and serving as an atomizing-chamber, passages leading to the atomizing-chamber from below the surface of the liquid vehicle, a pipe arranged horizontally about discharge-tube and communicating therewith, perforations in the lower side of the horizontal pipe, and means consisting of floats for maintaining the horizontal pipe a uniform distance above the surface of the liquid.

4. In an atomizer, the combination with a vessel for containing oily medicaments and a liquid vehicle, of a passage leading from a convenient source of compressed air and terminating in a plurality of discharge-nozzles one being arranged centrally of the others, a cap surrounding the central discharge and serving as an atomizing-chamber, passages leading to the atomizing-chamber from below the surface of the liquid vehicle, a pipe arranged horizontally about the discharge-tubes and communicating therewith, perforations in the lower side of the horizontal pipe, and means consisting of floats maintaining the horizontal pipe a uniform distance above the surface of the liquid.

In testimony whereof I hereunto affix my signature in the presence of two witnesses.

ANTON BULLING.

Witnesses:
ULYSSES BYWATER,
ABRAHAM SCHLESINGER.